US008480882B2

(12) United States Patent
Cueman et al.

(10) Patent No.: US 8,480,882 B2
(45) Date of Patent: Jul. 9, 2013

(54) WATER FILTER PITCHER METER

(75) Inventors: Glenn Cueman, Denver, NC (US); Bob Beckmann, Vale, NC (US)

(73) Assignee: Protect Plus LLC, Hickory, NC (US)

( * ) Notice: Subject to any disclaimer, the term of this patent is extended or adjusted under 35 U.S.C. 154(b) by 425 days.

(21) Appl. No.: 12/791,635

(22) Filed: Jun. 1, 2010

(65) Prior Publication Data
US 2011/0290741 A1 Dec. 1, 2011

(51) Int. Cl.
*B01D 17/12* (2006.01)
*B01D 24/10* (2006.01)

(52) U.S. Cl.
USPC ............... 210/85; 116/298; 116/309; 210/91; 210/94; 210/466; 210/470; 210/474; 210/482; 222/23; 222/189.06

(58) Field of Classification Search
USPC .......................................... 116/290, 298, 309
See application file for complete search history.

(56) References Cited

U.S. PATENT DOCUMENTS

| 4,986,901 | A | * | 1/1991 | Nohren et al. | 210/85 |
| 5,900,138 | A | * | 5/1999 | Moretto | 210/85 |
| 6,033,557 | A | * | 3/2000 | Gebhard et al. | 210/85 |
| 6,224,751 | B1 | * | 5/2001 | Hofmann et al. | 210/85 |
| 6,565,743 | B1 | * | 5/2003 | Poirier et al. | 210/85 |
| 7,201,840 | B2 | * | 4/2007 | Tsataros et al. | 210/85 |
| 7,294,277 | B2 | * | 11/2007 | Moretto | 210/746 |
| 7,569,138 | B2 | * | 8/2009 | Moretto | 210/85 |
| 7,722,761 | B2 | * | 5/2010 | Moretto | 210/109 |
| 8,056,748 | B2 | * | 11/2011 | Chen | 220/254.1 |
| 2004/0069695 | A1 | * | 4/2004 | Isobe et al. | 210/91 |
| 2006/0191824 | A1 | * | 8/2006 | Arett et al. | 210/85 |
| 2007/0169632 | A1 | * | 7/2007 | Beesley et al. | 99/279 |
| 2007/0278141 | A1 | * | 12/2007 | Patera et al. | 210/110 |
| 2008/0160143 | A1 | * | 7/2008 | Edwards et al. | 426/129 |
| 2012/0048787 | A1 | * | 3/2012 | Rajan et al. | 210/85 |

* cited by examiner

Primary Examiner — Joseph Drodge
(74) Attorney, Agent, or Firm — Clements Bernard PLLC; Seth L. Hudson

(57) ABSTRACT

The present invention is a water filter pitcher equipped with a removable, replaceable filter cartridge and means to count the number of times the pitcher is filled with water, and also means to notify the user when the pitcher has filtered enough water to exhaust the filtering capacity of the filter cartridge so that the user can replace the filter cartridge when necessary but does not have to remember to change the cartridge at a specific interval or count the number of gallons filtered manually, and instead can rely on the water filter pitcher to track the amount of water filtered and inform the user when to change the filter cartridge.

12 Claims, 7 Drawing Sheets

WATER FILTER PITCHER METER

FIELD OF THE INVENTION

The present invention is generally directed to a liquid filtration device typically used in residential applications or in any application where a filtered liquid is desired. The invention is more specifically directed to a water filtration device that tracks the life of the filter cartridge. The invention is designed for use as a standard water pitcher typically used in household kitchens. The invention more specifically relates to an apparatus and method used to track the number of times a water pitcher with a filter cartridge is filled with water in order to ensure that the owner is notified when the filter cartridge needs to be replaced.

BACKGROUND OF THE INVENTION

Water is a basic necessity to sustain all life. Every living thing on the planet, animal and plant, needs water to survive. As such, the need for clean, pure water will never decrease. In fact, as populations grow, the need for clean, pure water will only increase. Recently, society has begun to focus more on the purity of water for both drinking and other applications. Pure water is bottled by a multitude of manufacturers and is sold in many places. Demand for pure bottled water is increasing and shows no signs of waning.

The medical community in the United States periodically issues statements that indicate the average person does not drink enough water. Unlike soda, milk, and other beverages, water is available to most people simply by turning on a faucet. Typically, a local utility company provides water to people. The utility company is generally responsible for ensuring that the water provided to homes and businesses is clean, pure, and free from harmful organisms. Indeed, many people rely solely on the public water systems to guarantee that the water flowing into their homes and businesses is fit for consumption. Typically, the municipal body responsible for providing water to the populace will have various treatment and purification procedures to help ensure the quality of the water provided to consumers. These systems can include large, industrial scale filters, treatment tanks, and other water processing devices. Unfortunately, sometimes these systems can break down, or these systems can miss a contaminant leaving the treated water with various forms of impurities.

Since water is such a vital part of people's everyday needs, the desire for clean, pure water continues to grow. Most municipal treatment facilities do an adequate job in cleaning and purifying water, however, there is concern that the municipal systems responsible for providing clean, pure water are simply overworked. Filtration of water on such a large scale can sometimes lead to water that contains particulate filtrate material left over from where the water was originally filtered. Moreover, some of the treatment methods and additive chemicals used in the cleaning and purifying of water can leave the water containing undesirable contaminants.

Municipal water treatment systems typically focus on removing various contaminants from water in order to provide clean, potable water for human consumption. Large scale purification of water is designed to reduce or eliminate the concentration of particulate matter including suspended particles, parasites, bacteria, algae, viruses, and fungi. Also, the municipal treatment facilities have apparatuses and methods to remove a wide range of dissolved and particulate material picked up by water from the surfaces the water may have made contact with after falling as rain and flowing to the treatment facility.

In the United States, the standards for drinking water quality are typically set by the government and have certain thresholds designed to ensure the drinking water is safe for consumption. In other countries around the world, however, the standards and thresholds for certain contaminants are not as stringent. Thus the warning of "don't drink the water," in various places around the world.

According to a 2007 World Health Organization report, 1.1 billion people lack access to an improved drinking water supply. The WHO estimates that 88% of the 4 billion annual cases of diarrheal disease are attributed to unsafe water and inadequate sanitation and hygiene. Further, 1.8 million people die from diarrheal diseases each year. The WHO further estimates that 94% of these diarrheal cases are preventable through modifications to the environment, including access to safe water. The WHO concludes that a few simple techniques for treating water at home, such as chlorination, filters, and solar disinfection, combined with storing it in safe containers could save a huge number of lives each year.

In most cases, it is not possible to tell whether water is of an appropriate quality by visual examination. If water has a cloudy appearance or there are visible particles present, then the water is most likely unsafe to drink. However, many dangerous contaminants are simply too small to be visible to the naked eye. It is impossible to know that the water is clean, pure, and fit to drink simply by looking at it. Thus, some simple procedures such as boiling or the use of a household activated carbon filter have been devised in an attempt to clean and purify water for drinking. Unfortunately, these simple steps are not sufficient for treating all the possible contaminants that may be present in water from an unknown source. Even natural spring water, which in the nineteenth century was considered safe for all practical purposes, must now be tested before determining what kind of treatment, if any, is needed. A chemical analysis of water, while expensive, is the only way to obtain the information necessary for deciding on the appropriate method of purification.

Thus, a need exists for a simple, easy to use device that will ensure that water is clean, pure, and does not contain harmful contaminants. More specifically, a need exists for a filter capable of residential use or small commercial use that will allow persons to be assured that any contaminants left in water after the municipal treatment of the water are removed prior to drinking. More particularly, there are growing desires from people for a water filter for use in residences that will provide clean, purified water to the homeowner. People want a device that will hold water and purify the water prior to its consumption. As such, water pitchers equipped with filters for filtering water as it is poured from the pitcher have become increasingly popular.

While there are many water pitchers currently available that contain a filter, most of these pitchers are unable to provide a reliable means by which a user is notified to change the filter cartridge. As such, once the filter cartridge has been in use beyond its intended use, unless the user is continually monitoring the filter, he or she would not know to replace the cartridge. A user must manually track and or record each time the filter is used in order to know when the cartridge should be replaced. Or, a user could simply replace the filter cartridge at a particular interval of time. This is problematic, however, because different users will use water from the pitcher at different rates. Thus, there is a need for a water pitcher that will filter water and notify the user when the filter cartridge needs replacing. Currently there are a number of water pitcher filter devices known in the prior art, yet none of them meets the current need.

U.S. Pat. No. 5,900,138 to Moretto discloses and teaches a water pitcher containing a filter cartridge. Moretto discloses a water pitcher with a removable lid. When the lid is removed a counter advances by one increment. At a predetermined number of increments, the user is notified that the filter cartridge is in need of replacement. However, this requires that the lid of the pitcher be removed completely from the main body of the pitcher. This is a problem because when removed from the pitcher, the filter element can be exposed to impurities on a counter, stove, or any other surface upon which it is rested.

U.S. Pat. No. 4,986,901 to Nohren, Jr. et al. discloses and teaches a cap for use on water bottles. The cap contains detents corresponding to the cap body. The cap body is released and water can flow from the bottle outwardly through the cap. Each time the bottle is filled the cap is rotated one detent. The user removes the cap and fills the bottle with water. However, the user must remember to rotate the cap each time the bottle is filled with water. Once the cap is rotated to a predetermined extent, it is time to change the water filter in the bottle. Too much room for error exists, however, because if alternate people fill the bottle each must remember to rotate the cap every time. Further Nohren utilizes pressure to filter the water in the bottle. A user squeezes the bottle and the water flows through the filter and out through the cap. Since the user rotates the cap each time the bottle is used, what is actually being counted is the use of the bottle, not the volume of water filtered or the time of use of the filter cartridge. Nohren does not disclose or teach a device or method that measures volume of water filtered or time in use of the filter cartridge.

U.S. Pat. No. 6,244,751 to Hoffman et al. discloses and teaches a water filter pitcher that filters water prior to use. The pitcher discloses and taught by Hoffman has an electronic circuit built into the lid that is powered by a battery. The indicator taught by Hoffman measures only elapsed time. Indeed, Hoffman specifically limits the indicator to measuring only the elapsed time, restricting it from any other signaling. The inherent problem with this device, is that it measures only time. If the water pitcher is used more than predicted, the filter cartridge will become ineffective before the set time limit. Thus, using the water pitcher until the elapsed time is reached would mean that the water is actually not being filtered properly, as the filter cartridge has expired. Also, if the filter pitcher is under used, the filter cartridge will still have useable life in it when the timer indicates that it should be replaced. Thus, counting only elapsed time to measure when the filter cartridge needs to be replaced is problematic.

Therefore, a need exists for a water pitcher that will filter water and that does not suffer from the disadvantages of water pitchers according to the prior art. Indeed, a water filter pitcher is needed that will indicate to users when it is time to replace the filter cartridge by measuring the amount of water filtered. Moreover, a need exists for a water filter pitcher that does not require a user to remember to take an action each time the pitcher is filled with water. Further, a need exists for a water filter pitcher that has an easily replaceable filter and does not require the use of special tools. Further, a need exists for a water filter pitcher that can take advantage of the current available filter cartridges for ease of replacement. Moreover, a need exists for a water filter pitcher that can communicate that the filter cartridge needs replacing and is not dependant on additional actions by the user. The present invention fulfills these long-felt needs.

BRIEF SUMMARY OF THE INVENTION

The present invention relates to water treatment devices, in particular, filter pitchers designed for use in residences or small, commercial settings. The present invention is in its most general form a liquid filtration device for the filtering of liquids. In its preferred embodiment, the present invention is designed to store and filter water in a pitcher. The present invention is generally a pitcher designed for ease of handling and pouring water. The invention includes a filter cartridge that filters the water as it is poured into the top of the pitcher. The water flows first into an upper reservoir where it then drains into a filter kit where it passes through a filter cartridge and is filtered. The filter cartridge is easily replaceable when its useful life is up, and the pitcher can be designed to fit any number of commercially available filter cartridges already on the market. Further, the pitcher is adapted to indicate to the user that the filter cartridge needs to be replaced at a particular interval. More specifically, the pitcher is adapted to count each time the pitcher is filled with water. Once the predetermined number of fillings occurs, the pitcher indicates to the user that the cartridge needs to be replaced. Thus, the pitcher itself counts the number of times it is filled with water without relying on a user to remember to take action each time the pitcher is filled. Unlike the majority of the prior art, the pitcher is configured to count the amount of water filtered, not a particular time period.

A significant advantage to the new water filter pitcher is its ability to use readily available cartridges. Applicant has designed the water filter pitcher to utilize filter cartridges from Applicant's current line of replacement filter cartridges. An advantage of this is that the retailer does not have to add additional inventory items to its product line, thus limiting the number of SKU's that the retailer must carry. A still further advantage of using existing filter cartridges is the interchangeability of filter cartridges between the existing water filter pitchers and the new pitcher. The water filter pitcher can be designed and configured such that it can accommodate a wide range of commercially available filter cartridges simply by adapting the filter kit that fits inside the pitcher.

More specifically, the present invention is directed to a water filter pitcher that has a lower reservoir. The lower reservoir has a pitcher top that fits on top of the lower reservoir and can be removed, if necessary. The pitcher top has an upper reservoir contained within the pitcher top. The pitcher top also has a filter housing affixed to and extending below the pitcher top's upper reservoir. The filter housing is manufactured to contain a filter kit. The pitcher top has a fill lid attached to it that opens and provides access to the interior of the pitcher top. The fill lid may open by flipping up, sliding, or otherwise moving to expose the interior of the pitcher. The fill lid is adapted to contain counting means for counting the number of times the fill lid is opened. The pitcher top may have a window through which there are means for displaying information, or the counting means may include a visable counter on the exterior of the lid such that no window is necessary to see the number of times the fill lid is opened. The information displayed and visible is generally regarding the filter cartridge and/or the number of times the fill lid has been opened to fill the pitcher. The water filter pitcher also includes a handle and a spout.

The present invention is further directed to and includes a system of displaying information regarding the volume of water such as gallons, liters, etc. that has been filtered by the device. The counting means may be operated by a system of levers, ratchets, and gears. The counting means may also operate on the basis of an electrical circuit designed to track the number of times the filter top has been opened. This may be by means of a standard electrical circuit operated by a battery, or it may be by means of a magnetic field that counts the number of times a magnet is passed into and out of the field. In a simple, preferred embodiment, the counting mechanism is a system of gears that are actuated by a tension spring pressing against the fill lid and a motion trigger. When the fill lid is slid open or raised to fill the water filter pitcher with water, the gears are activated and the counter is advanced. This mechanism can include a pin on the motion trigger adapted to advance a ratchet. The ratchet is rotatably mounted inside the fill lid. The ratchet has a small gear integrally affixed to the surface of the ratchet and adapted to engage a meter disk. The meter disk contains graphic indicia such as a graphic disk that can be adapted to be visable through the pitcher top and to communicate information regarding the water filter cartridge to the user.

The present invention further contemplates a counter mechanism that is mechanically or electrically engaged to a display for conveying information to the user regarding the amount of water filtered. Further, the counting mechanism is equipped with a reset, zeroing, or other device that allows the user to return the counting mechanism to its original state, i.e. zero water filtered. In an embodiment that utilizes a mechanical counting means, the reset is generally in the form of a lever or trigger that when moved rotates the counting mechanism back to the zero state through a system of gears, levers, ratchets, etc. In an embodiment utilizing an electronic circuit, the reset is generally in the form of a button or switch that when activated resets the electronic counter to the zero or initial state. Further, in an embodiment utilizing a magnetic field to count the number of times the fill lid has been opened, the reset can be in the form of a switch configured to reset the counting mechanism. Thus, a user can manually reset the counting mechanism when the filter cartridge is replaced.

The invention further includes a filter kit that is comprised of a bottom housing adapted to contain a filter cartridge. The bottom housing has an opening at its base and is removably attached to a dome that fits on top of the bottom housing. The dome has openings in its surface that permit water to pass into the interior of the dome and flow downwardly through the filter kit into the filter cartridge. Once the water flows through the filter cartridge it flows out the bottom housing through the opening and into the lower reservoir.

The present invention further contemplates a lower reservoir and a pitcher top removably affixed to the lower reservoir. The pitcher top includes an upper reservoir integrally formed with a filter housing adapted to contain a removable filter kit. The filter kit contains a replaceable filter cartridge. Also the pitcher top contains a fill lid adapted to contain counting means for counting the number of times the fill lid is opened. The present invention also includes means for displaying information regarding the filter cartridge and/or the number of times said fill lid is opened.

The present invention is also directed to and can include an electrical circuit adapted to signal upon raising of the fill lid. The means for displaying information can be an LED, an LCD, or a light bulb. These are further contemplated to have the ability to display different colors.

The present invention is further contemplated to include a system of magnets. The system of magnets operate to count the number of times the pitcher is filled with water. The fill lid of the pitcher is equipped with a magnetic field detector and the pitcher top is equipped with a corresponding magnet. When the fill lid is raised the magnet passes in and out of the magnetic field, thus activating the counting means. The counting means activated by the magnets also is connected to a reset switch whereby the user can reset the magnetic counter to the zero or initial state.

The present invention further contemplates and discloses a method of providing clean, filtered water. The method includes the steps of providing a water filter pitcher. The provided water filter pitcher includes a lower reservoir and a pitcher top removably affixed to the lower reservoir. The provided water filter pitcher has a pitcher top that includes an upper reservoir integrally formed with a filter housing adapted to contain a removable filter kit, the filter kit containing a replaceable filter cartridge. The pitcher top also includes a fill lid adapted to contain counting means for counting the number of times the fill lid is opened and means for displaying information regarding the filter cartridge and/or the number of times the fill lid is opened. The provided water filter pitcher also includes a handle and a spout. The method also includes the step of opening the fill lid and pouring water into the water filter pitcher. Further, the method includes the step of replacing the replaceable filter cartridge when its life is exhausted.

DETAILED DESCRIPTION OF THE INVENTION

The water filter pitcher according to the present invention solves the problems encountered in the prior art related to water pitchers. Specifically, the present invention keeps track of the amount of water filtered by the pitcher in order to indicate to the user when the filter capacity of the filter cartridge is exhausted. Thus, the user can replace the filter cartridge with a new cartridge. The water filter pitcher can be designed to utilize a replaceable filter cartridge widely available at stores. Another advantage of the present invention is that the water filter pitcher keeps track of the amount of water filtered independent from any action by the user other than normal use of the pitcher.

Figure 1:
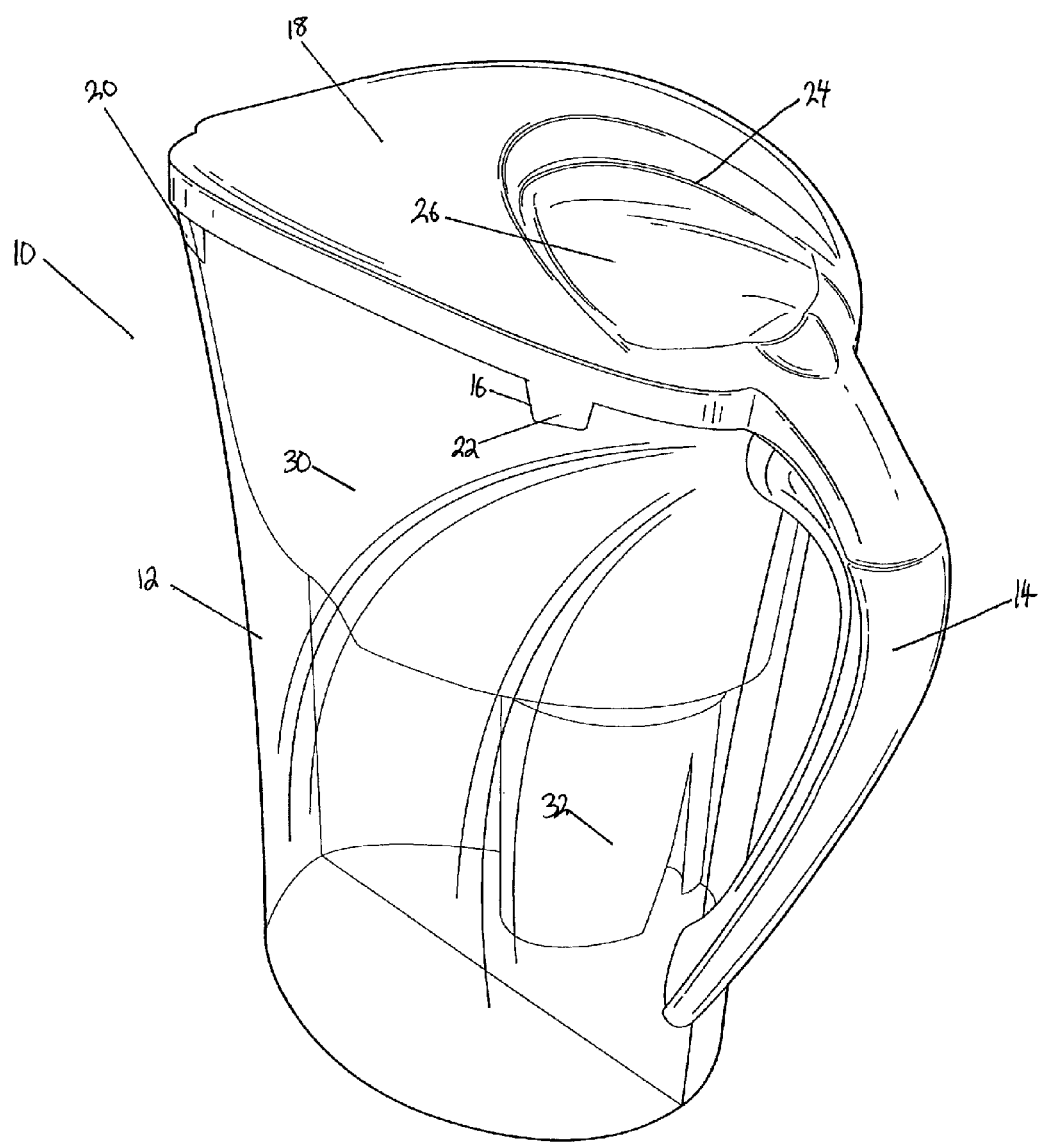
FIG. 1 is a front plan view of the water filter pitcher according to the present invention.

Referring now to FIG. 1, there is shown a water filter pitcher 10 according to the present invention. The water filter pitcher 10 generally comprises a lower reservoir 12 for holding filtered water. The lower reservoir 12 is adapted to contain a handle 14 protruding from the lower reservoir and extending upwardly toward the top of the lower reservoir 12. The top of the lower reservoir 12 is open and the lower reservoir 12 generally defines a pitcher. The top of the lower reservoir 12 contains attachment means 16 that are adapted to connect a pitcher top 18. The top of the lower reservoir 12 further defines a spout 20 located on the opposite side from the handle 14. The spout 20 aids in pouring filtered water from the water filter pitcher 10, directing it out of the lower reservoir 12. It should be appreciated by those skilled in the art that the lower reservoir 12 can have multiple shapes and sizes, all of which are contemplated to be within the scope of the invention.

The pitcher top 18 is generally designed and adapted to fit over the top of the lower reservoir 12 so that the junction forms a liquid tight seal and will not leak. The pitcher top 18 is further adapted to fit partially over the handle 14, which provides a secure grip upon the water filter pitcher 10 and further secures the pitcher top 18 to the lower reservoir 12. The pitcher top 18 is equipped with tabs 22 or other attachment means that are complementary to the top attachment means 16, integral to the lower reservoir 12. When engaged to the top attachment means 16 on the lower reservoir 12, the tabs 22 securely fasten the pitcher top 18 to the lower reservoir 12. The attachment means used to affix the pitcher top 18 to the lower reservoir 12 are generally intended to be secure enough that the pitcher top 18 seems to be integral to the lower reservoir 12. This is done because it is contemplated that the pitcher top 18 will only be removed from the lower reservoir 12 when it is time to change the filter cartridge. As such, the pitcher top 18 attaches to the lower reservoir 12 more securely than conventional water pitchers. Because the water filter pitcher 10 is designed to be refilled without removing the pitcher top 18, the pitcher top 18 can be more securely attached to the lower reservoir 12. This allows the water filter pitcher 10 to be of a more rigid construction, thus prolonging the life of the water filter pitcher 10.

Still referring to FIG. 1, the pitcher top 18 is constructed to define an opening 24 in the surface of the pitcher top 18. The opening 24 is covered by a fill lid 26 that is designed to completely cover the opening 24 in the pitcher top 18. The fill lid 26 can be constructed with a thumb tab 28 (shown in FIG. 3) designed to assist the user in opening the fill lid 26. The fill lid 26 is affixed to the pitcher top by conventional means, generally comprising a hinge (not shown). This allows the user to open the fill lid 26 and gain access to the interior of the water filter pitcher 10. The fill lid 26 is designed to open and allow the user to pour water into the water filter pitcher 10. Thus, the pitcher top 18 can be designed to have a sloping portion angling downwardly toward the opening 24 so that any water that spills on the pitcher top 18 will drain toward the opening 24.

The fill lid 26 covers the opening 24 and provides access to the interior of the water filter pitcher 10. The pitcher top 18 is further comprised of an upper reservoir 30 that is integrally attached to the pitcher top 18. In a preferred embodiment, the upper reservoir 30 is of unitary construction with the pitcher top 18, thus ensuring that there is no possibility for leaks. The upper reservoir 30 is constructed to provide a filter housing 32 that will contain a water filter cartridge (not shown) that will filter water as it passes into the water filter pitcher 10 from the opening 24 and down toward the lower reservoir 12. The forces of gravity draw the water downwardly through the filter cartridge thereby filtering the water as it passes into the lower reservoir 12. The filter housing 32 is designed such that when a filter cartridge is placed into the filter housing 32 it is in liquid tight engagement and there is no chance for leaks that could contaminate the filtered water in the lower reservoir 12. Once the water has passed from the upper reservoir 30 into the lower reservoir 12, it is filtered and ready for use.

Figure 2:
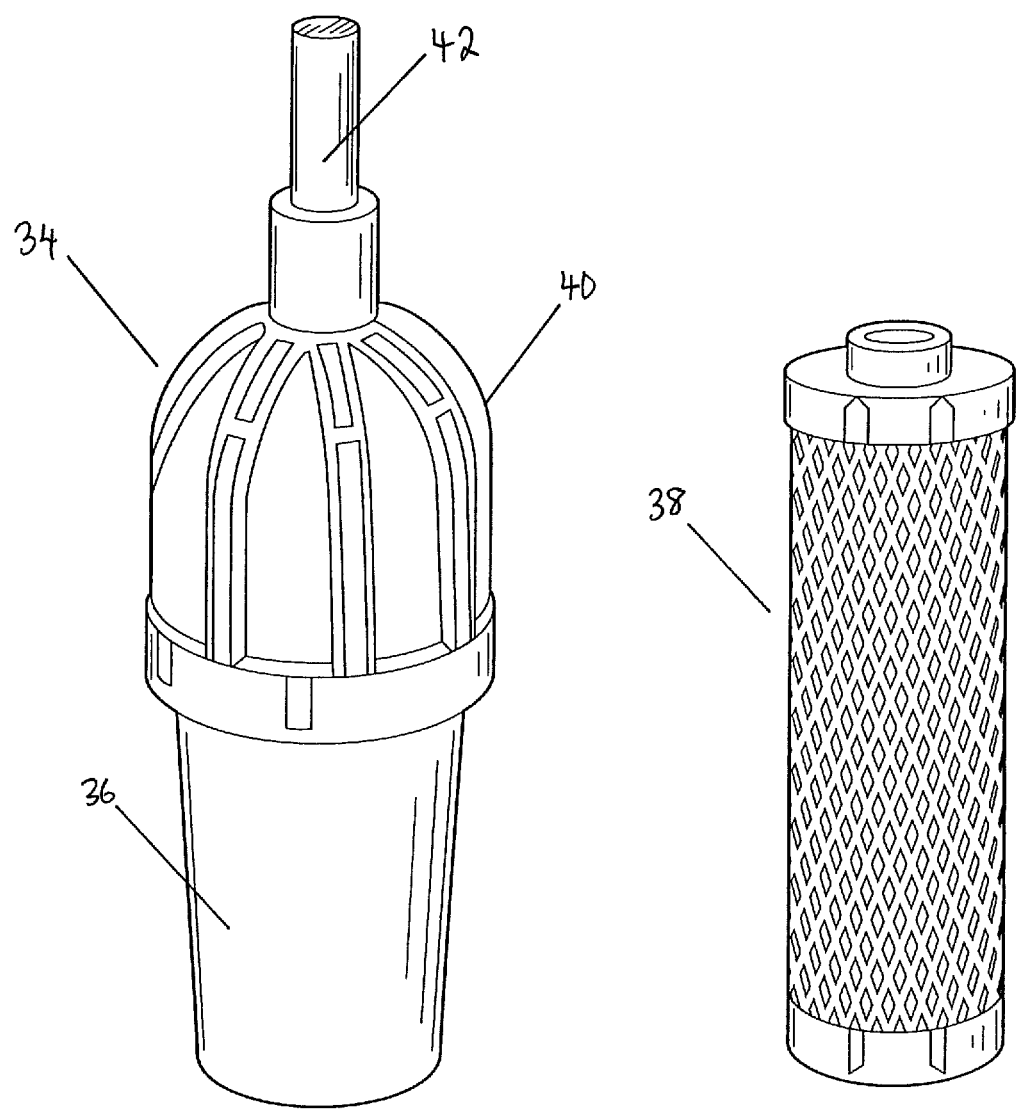
FIG. 2 is a front plan view of the filter kit and filter cartridge according to the present invention.

Referring now to FIG. 2, a filter kit 34 is shown. The filter kit 34 is designed to fit into the filter housing 32 that is integral to the upper reservoir 30. The filter kit is comprised of a bottom housing 36 adapted to contain a filter cartridge 38, within the bottom housing 36 of the filter kit 34. The bottom housing 36 is further manufactured to contain a hole (not shown) in the bottom of the filter kit 34 to allow filtered water to drain from the filter kit 34 into the lower reservoir 12 after it has passed through the filter cartridge 38 and been filtered. The filter kit 34 further comprises a dome 40 that is removably attached to the bottom housing 36 of the filter kit 34. The dome 40 is fastened to the bottom housing 36 by conventional means. In a preferred embodiment, the dome 40 is threaded in order to screw onto the bottom housing 36 and provide a water tight seal. It is further contemplated that an o-ring or other part could be present to ensure a water tight seal between the dome 40 and the bottom housing 36. Extending above and out of the top of the dome 40 is an air vent tube 42. The air vent tube 42 is slidingly engaged to the top of dome 40 such that it can be pulled outwardly from the top of the dome 40 and pushed inwardly toward the bottom housing 36. The air vent tube 42 is attached to the dome 40 in a water tight engagement so that no water can enter the dome 40 through the air vent tube/dome connection.

In normal operation, the air vent tube 42 is retracted into the dome 40 so that it does not protrude above nor interfere with the pitcher top 18. When the water in the lower reservoir 12 is used and it is time to replenish the water filter pitcher 10 with water, the user opens the fill lid 26 to access the interior of the water filter pitcher 10. Once the fill lid 26 is raised, the air vent tube 42 becomes accessible to the user. The user extends the air vent tube from the dome 40, extending it fully so that the air vent tube 42 extends above the pitcher top 18. The air vent tube 42 is configured to allow air from the lower reservoir 12 to escape as the water from the upper reservoir 30 passes through the filter kit 34 and into the lower reservoir 12. The user pours water through the opening 24 and into the upper reservoir 30 taking care to avoid pouring the water into the air vent tube 42. Once the water has filled the upper reservoir 30 and is ready to pass through the dome 40 and into the filter cartridge 38, the user presses the air vent tube 42 back into the top of the dome 40 to its normal position.

The dome 40 is adapted to receive water and allow water to pass through its surface and into the filter kit 34. The dome 40 can be configured to allow water to penetrate it in any conventional manner. In a preferred embodiment, the dome 40 is constructed with a plurality of holes in its surface of sufficient size that water may pass through. The dome 40 could also be constructed to have slits, or be in the form of a simple screen or wire mesh. It should be appreciated by those skilled in the art that the dome 40 could also be manufactured of material porous enough for water to seep through, although this is less desirable as it typically takes much longer for water to pass through a membrane or other solid material.

Once the water passes through the dome 40 into the interior of the filter kit 34, the water passes into the filter cartridge 38 where it is filtered. The filter cartridge can be of any conventional type, provided that the flow rate of water through the filter cartridge 38 is acceptable for use in a pitcher. Under the forces of gravity, the water passes through the filter cartridge 38 where impurities are removed from the water. The filter cartridge 38 may contain any number of conventional filtering media. In a preferred embodiment, the filter cartridge 38 contains activated carbon. Once the water is filtered by the filter cartridge 38, it passes downwardly through the filter cartridge 38 and out into the lower reservoir 12. The water is now filtered and ready for use. The filter cartridge 38 is designed to fit inside the filter kit 34 such that the filter cartridge 38 is in liquid tight contact with the bottom housing 36 of the filter kit 34. This ensures that all water that passes into the filter kit 34 must pass through the filter cartridge before exiting into the lower reservoir 12. This ensures that the water in the lower reservoir 12 remains filtered and is not exposed to potentially unfiltered water.

Figure 3:
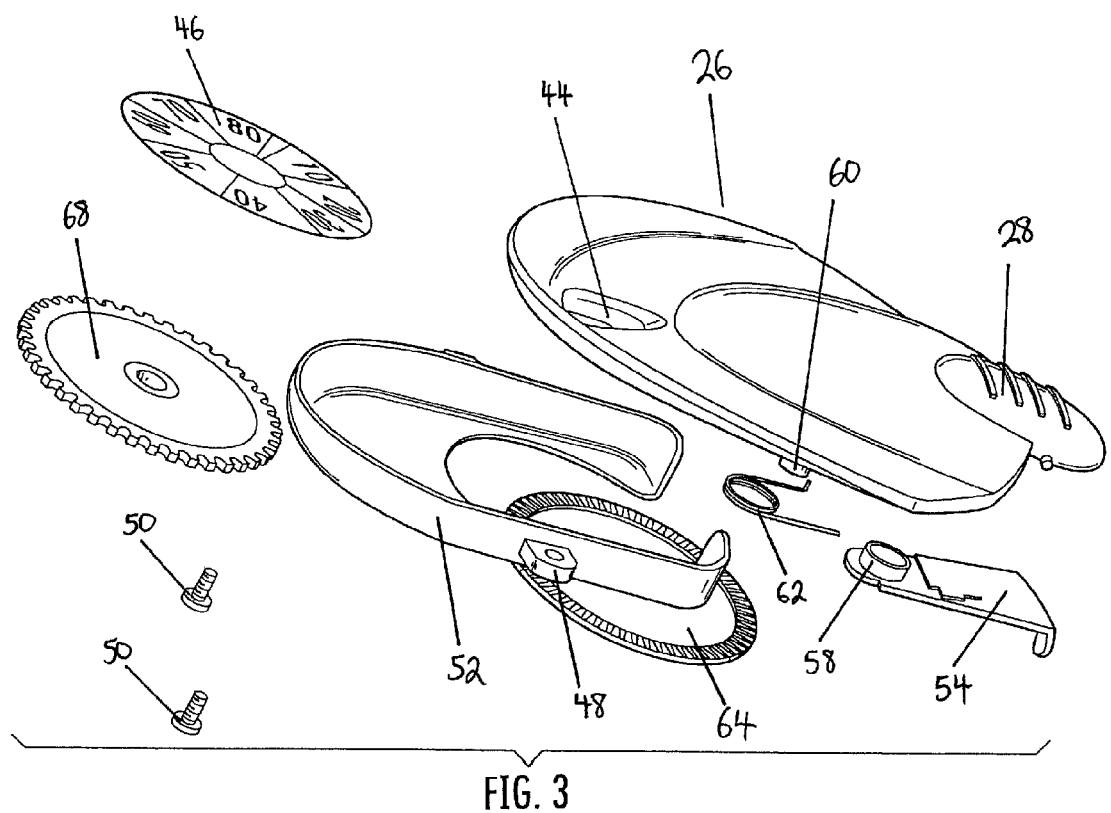
FIG. 3 is an exploded view of the fill lid of the water filter pitcher according to the present invention.
Figure 4:
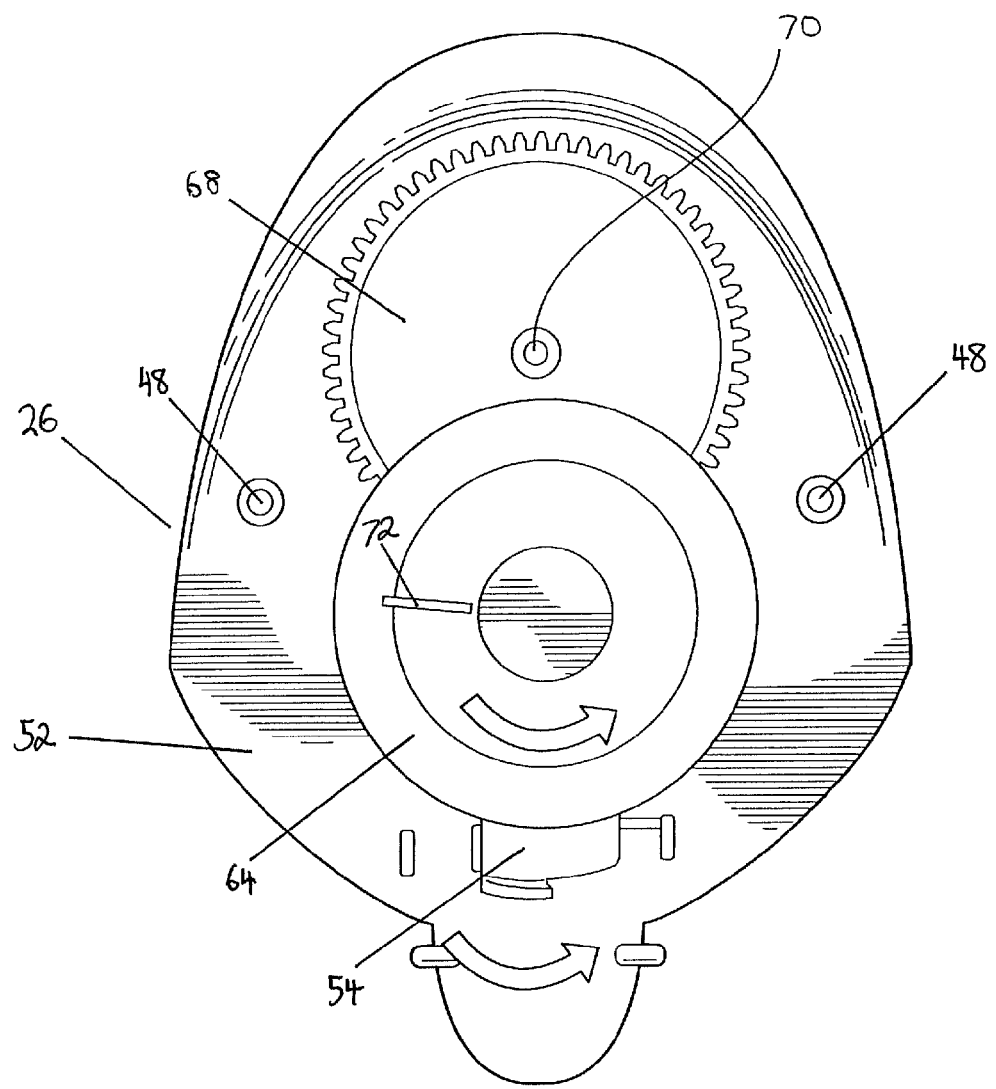
FIG. 4 is a bottom view of the fill lid of the water filter pitcher according to the present invention.

According to the invention, the water filter pitcher 10 is equipped with a device to count the number of times the fill lid 26 is opened. Referring to FIGS. 3 and 4, the device is housed within the fill lid 26. The fill lid 26 is manufactured to define a window 44 on the top surface of the fill lid 26. The window 44 can be a simple opening, or it may be comprised of an opening covered by a transparent cover, so as to allow one to see below. Directly below the window 44 is a graphic disk 46. The graphic disk 46 is marked to indicate various indicia regarding the filter cartridge. In a preferred embodiment, the graphic disk 46 is marked with numbers that correspond to the number of times the fill lid 26 is opened which in turn corresponds to the amount of water that has been filtered. The graphic disk 46 can also be marked with instructions such as "Replace Filter" or "10 Fills Remaining." As can be appreciated by those in the art, the graphic disk 46 can be used to communicate many different types of information to the user.

As seen more clearly in FIG. 4, on the under side of the fill lid 26, the interior side hidden from view when the fill lid 26 is closed, there are a plurality of protruding ports 48 that are adapted to accept screws, clasps or other attachment means. In a preferred embodiment, cover screws 50 are used. Attached to the interior side of the fill lid 26 is a meter cover 52. The meter cover 52 is shaped to define an open, rounded portion in which is fitted the counting mechanism for the water filter pitcher 10.

Directly under the thumb tab 28 on the fill lid 26 is a motion trigger 54. The motion trigger 54 is adapted to be activated each time the fill lid 26 is opened. Thus, the motion trigger 54 is triggered when a user depresses the thumb tab 28 to open the fill lid 26 and gain access to the upper reservoir 30. The motion trigger 54 is further adapted to form a pin 56 and a retaining post 58. The retaining post 58 is complementary to a protrusion 60 on the interior side of the fill lid 26. The protrusion 60 maintains the motion trigger 54 in place by accepting and securing the retaining post 58.

The motion trigger 54 further includes a spring 62 adapted for connection to the motion trigger 54 and the fill lid 26. The spring 62, typically a tension spring, maintains the motion trigger 54 in a stable position. When the thumb tab 28 is depressed and the fill lid 26 opens, the spring 62 is activated and presses against the motion trigger 54. The motion trigger 54 moves, thereby moving the pin 56 that is integral to the motion trigger 54. The pin 56 is seated in a ratchet 64, generally in the form of a large gear, and advances the ratchet 64 by one notch. The ratchet 64 is adapted such that the pin 56 can move the ratchet 64 in one direction only, thereby advancing it one notch each time the fill lid 26 is opened.

Figure 5:
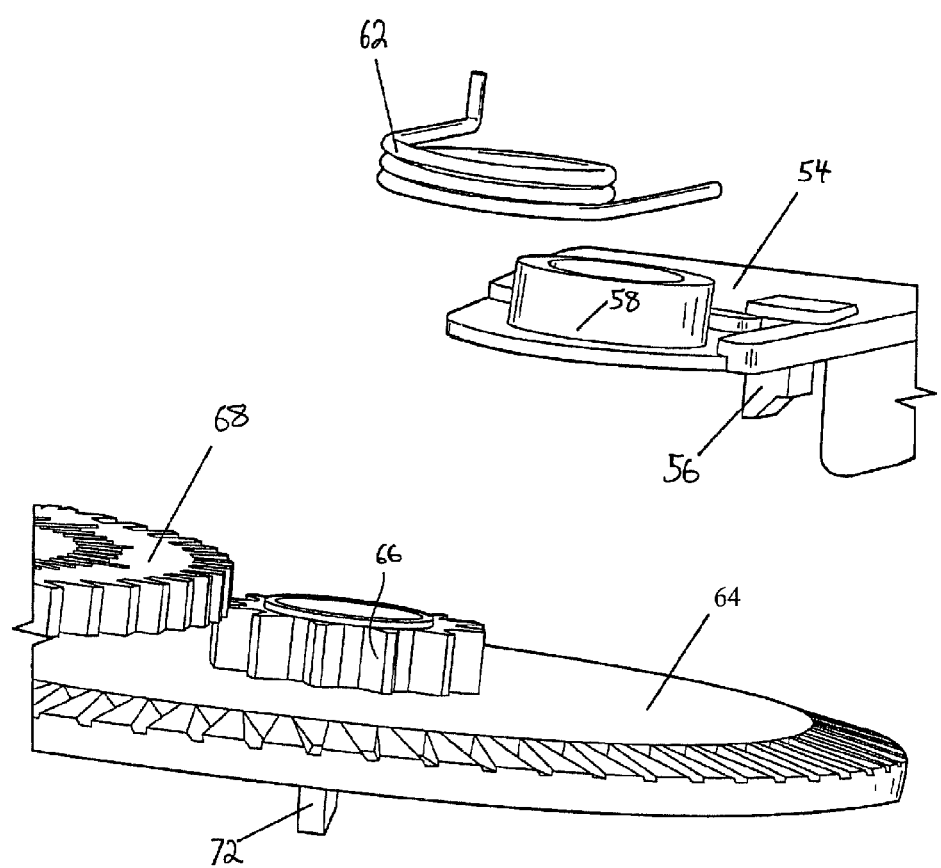
FIG. 5 is an enlarged, partial, exploded view of the internal gearing of the water filter pitcher according to the present invention.

Still referring to FIGS. 3 and 4, and additionally referring to FIG. 5, it is shown that the ratchet 64 is adapted to rotate around the protrusion 60 from the fill lid 26. Thus, the protrusion 60 acts as an axis about which the ratchet 64 rotates, securing the ratchet in place. On the surface of the ratchet 64 is a small gear 66 that is affixed to the ratchet 64. When the motion trigger 54 is activated and engages the pin 56 that moves the ratchet 64, the gear 66 also moves one position forward. The gear 66 engages a meter disk 68 that is also generally in the form of a gear. The meter disk 68 is secured to the fill lid 26 via a second protrusion 70 from the interior of the fill lid 26. The second protrusion 70 acts as an axis about which the meter disk 68 rotates. The meter disk 68 supports the graphic disk 46 and causes the graphic disk 46 to rotate with the meter disk 68. Thus, the graphic disk 46 is advanced one increment each time the fill lid 26 is opened through a series of gears. The ratchet 64 rotates in only one direction when moved via the motion trigger 54 and the pin 56, and it is held in place by the combination of the pin 56 and the forces from the spring 62. Thus, the graphic disk 46 cannot simply spin freely. This ensures that even if the water filter pitcher 10 is bumped or dropped, the count of the number of times the fill lid 26 has been opened is not lost. This ensures continued accuracy in the count, thus maintaining accurate measurements regarding when it is time to replace the filter cartridge 38.

The underside of the ratchet 64 is adapted to form a reset tab 72. The reset tab 72 is configured so that a user may press against the reset tab 72 and it will rotate the ratchet 64, and as describe above, the graphic disk 46, back to the original setting indicating a new filter cartridge 38. Thus, if for some reason a user decides to replace the filter cartridge 38 prior to the indication of filter cartridge exhaustion by the graphic disk 46, the user can reset the graphic disk 46 for a full count on the new filter cartridge 38.

Figure 6:
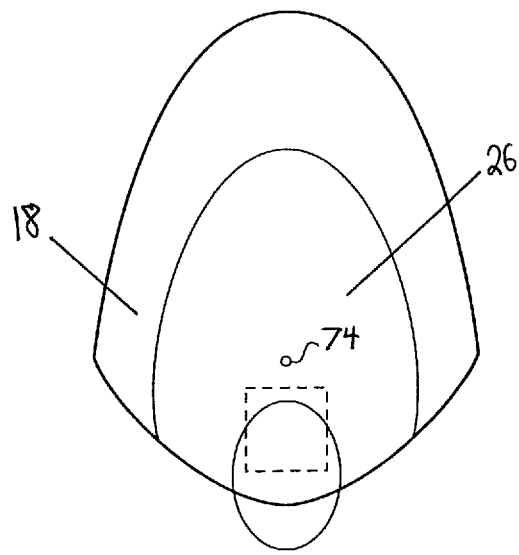
FIG. 6 is a top view of an alternative embodiment of the water filter pitcher according to the present invention.
Figure 7:
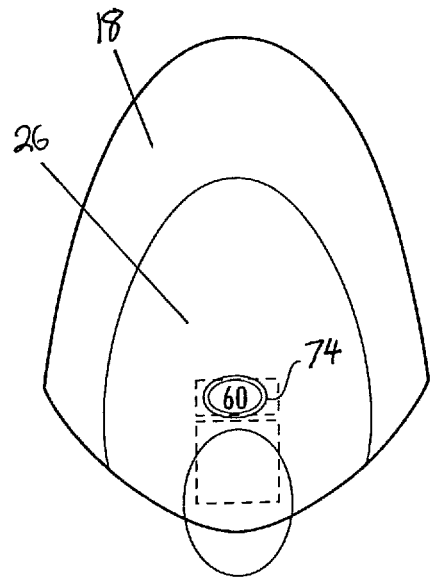
FIG. 7 is a top view of an alternative embodiment of the water filter pitcher according to the present invention.
Figure 8:
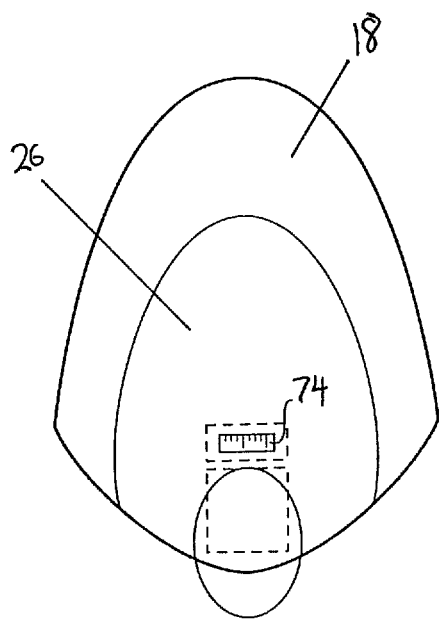
FIG. 8 is a top view of an alternative embodiment of the water filter pitcher according to the present invention.

FIGS. 6, 7, and 8 represent other variants of the device of the invention. As seen in FIGS. 6, 7, and 8, there is provided in the fill lid 26 an electronic display 74 that can be an LED, LCD, simple light bulb, or other conventional display type. The electronic display 74 is adapted to be powered by an integral battery (not shown) that is generally of the type used for watches. Thus, the battery is small and can fit within the fill lid 26 without significantly increasing the weight of the fill lid 26. An electrical circuit is established such that when the fill lid 26 is raised the circuit communicates with the electronic display 74. The electronic display 74 can be programmed to display any number of messages, numbers, instructions, etc. In a preferred embodiment, the electronic display 74 includes a reset button (not shown) whereby a user can reset the electronic display 74 to its initial state upon inserting a new filter cartridge 38 into the water filter pitcher 10. Thus the electronic display 74 serves the same function as the gearing components described earlier—it counts the number of times the fill lid 26 is opened, thus the number of times the filter cartridge 38 is used to filter water.

In yet another variation of the water filter pitcher 10, there is provided an electronic display 74 that performs as earlier described, but instead of utilizing an electrical circuit to signify when the fill lid 26 is opened, the electronic display 74 uses a tilt switch (not shown). When the fill lid 26 is opened, the tilt switch is activated and communicates to the electronic display 74 to advance the count by one.

Figure 9:
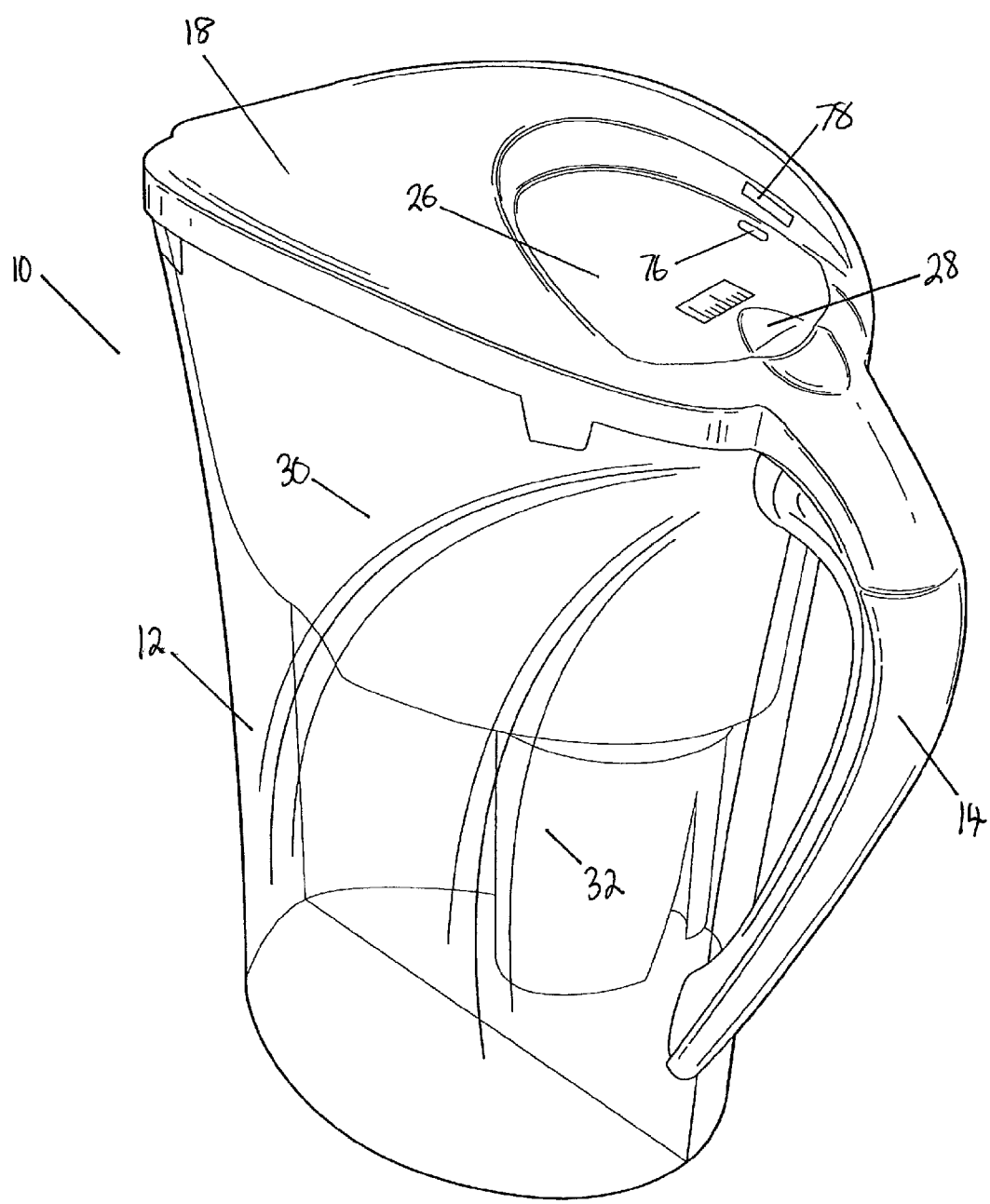
FIG. 9 is a plan view of an alternative embodiment of the water filter pitcher according to the present invention.

Referring now to FIG. 9, another embodiment of the present invention is shown. In another variation of the water filter pitcher 10, there is a system of magnets that function to count the number of times the pitcher is filled. The fill lid 26 is equipped with a magnetic field detector 76. The top lid is equipped with a magnet 78 such that when the magnet 78 passes the magnetic field detector 76 the count is triggered and advanced by one. This is accomplished by the use of an electrical circuit designed to detect and respond to magnetic fields.

As can be seen from the foregoing description of the present invention, a new water filter pitcher has been invented. Although the present invention has been illustrated and described herein with reference to preferred embodiments and specific examples thereof, it will be readily apparent to those of ordinary skill in the art that other embodiments and examples can perform similar functions and/or achieve like results. Pitchers are available in a great variety of sizes and configurations, and filter cartridges are also available in a large variety of sizes and filtering capacities. All such equivalent embodiments and examples are within the spirit and scope of the invention and are intended to be covered by the following claims.

We claim:

1. A water filter pitcher comprising:
    a lower reservoir,
    a pitcher top removably affixed to said lower reservoir, said pitcher top comprising:
        an upper reservoir,
        a filter housing affixed to and extending below said upper reservoir, said filter housing adapted to contain a filter kit,
        a fill lid adapted to contain counting means for counting the number of times said fill lid is opened, the fill lid includes a thumb tab for opening the fill lid when said thumb tab is depressed, and a motion trigger engaged to said thumb tab and having a pin that is engaged to a ratchet, the ratchet includes a small gear engaged to the surface of the ratchet, the small gear is engaged to a graphic disk, wherein the thumb tab is depressed causing the pin to rotate the ratchet, thereby causing the small gear to rotate, causing the graphic disk to rotate;
    a handle, and
    a spout.

2. The water filter pitcher of claim 1 wherein said motion trigger is connected to said fill lid by a spring.

3. The water filter pitcher of claim 1 further comprising a pin on said motion trigger adapted to advance a ratchet rotatably mounted inside said fill lid, said ratchet having a small gear integrally affixed to the surface of the ratchet and adapted to engage a meter disk, which is adapted to contain said graphic indicia.

4. The water filter pitcher of claim 1 wherein said filter kit is comprised of a bottom housing adapted to contain a filter cartridge, said bottom housing having an opening at its base and being removably attached to a dome wherein said dome has openings in its surface permitting water to pass into the interior of the dome and flow downwardly through said filter cartridge and out said bottom housing through said opening.

5. The water filter pitcher of claim 1 wherein said counting means is by way of an electrical circuit adapted to signal upon movement of said fill lid.

6. The water filter pitcher of claim 5 wherein said means for displaying information consists of an LED, an LCD, or a light bulb.

7. The water filter pitcher of claim 6 wherein said means for displaying information can display different colors.

8. The water filter pitcher of claim 1 wherein said counting means is a system of magnets and said counting means is activated by passing a magnet through a magnetic field.

9. The water filter pitcher of claim 1 further including reset means to return said counting means to the zero or initial state.

10. The water filter pitcher of claim 8 wherein said counting means is a system of magnets and said reset means is a button in communication with said system of magnets.

11. The water filter pitcher of claim 9 wherein said counting means is an electrical circuit and said reset means is a button in communication with said electrical circuit.

12. A method of providing clean, filtered water comprising the steps of: providing a water filter pitcher comprising:
    a lower reservoir,
    a pitcher top removably affixed to said lower reservoir, said pitcher top comprising:
        an upper reservoir integrally formed with a filter housing adapted to contain a removable filter kit, said filter kit containing a replaceable filter cartridge,
        a fill lid adapted to contain counting means for counting the number of times said fill lid is opened, wherein the counting means comprises a motion trigger engaged to said thumb tab and having a pin that is engaged to a ratchet, the ratchet includes a small gear engaged to the surface of the ratchet, the small gear is engaged to a graphic disk, wherein the thumb tab is depressed causing the pin to rotate the ratchet, thereby causing the small gear to rotate, causing the graphic disk to rotate;
    a handle,
    a spout;
    opening said fill lid and pouring water into said water filter pitcher,
    replacing said replaceable filter cartridge.

* * * * *